US012669704B2

(12) United States Patent
Hagen

(10) Patent No.: US 12,669,704 B2
(45) Date of Patent: Jun. 30, 2026

(54) PROJECTION ARRANGEMENT FOR A HEAD-UP DISPLAY (HUD) WITH P-POLARISED RADIATION AND MULTILAYER REFLECTIVE COATING FOR VEHICLE GLAZING

(71) Applicant: SAINT-GOBAIN GLASS FRANCE, Courbevoie (FR)

(72) Inventor: Jan Hagen, Bonn (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 511 days.

(21) Appl. No.: 17/925,155

(22) PCT Filed: Jun. 15, 2021

(86) PCT No.: PCT/EP2021/066099
§ 371 (c)(1),
(2) Date: Nov. 14, 2022

(87) PCT Pub. No.: WO2022/022886
PCT Pub. Date: Feb. 3, 2022

(65) Prior Publication Data
US 2023/0176374 A1 Jun. 8, 2023

(30) Foreign Application Priority Data
Jul. 29, 2020 (EP) .................................... 20188327

(51) Int. Cl.
*G02B 27/01* (2006.01)
*G02B 5/30* (2006.01)

(52) U.S. Cl.
CPC ....... *G02B 27/0101* (2013.01); *G02B 5/3041* (2013.01); *G02B 2027/012* (2013.01)

(58) Field of Classification Search
CPC . G02B 27/0101; G02B 5/3041; G02B 5/3066
See application file for complete search history.

(56) References Cited

U.S. PATENT DOCUMENTS

| 2017/0242247 A1 | 8/2017 | Tso et al. |
| 2019/0064516 A1 | 2/2019 | Wagner et al. |

FOREIGN PATENT DOCUMENTS

| CN | 10-2471153 | * | 5/2012 | ............. G03C 27/12 |
| CN | 106630688 A | | 5/2017 | |

(Continued)

OTHER PUBLICATIONS

International Search Report as issued in International Patent Application No. PCT/EP2021/066099, dated Sep. 16, 2021.

(Continued)

*Primary Examiner* — Lauren Nguyen
(74) *Attorney, Agent, or Firm* — CUSHMAN PARTNERS LLC

(57) ABSTRACT

A projection arrangement for a head-up display (HUD), includes a composite pane including an outer and inner panes joined to one another via a thermoplastic intermediate layer and has an HUD region; and an HUD projector directed at the HUD region. The radiation of the projector is at least partially p-polarised, and the composite pane is provided with a reflection coating suitable for reflecting p-polarised radiation. The reflection coating includes n electrically conductive layers based on silver and (n+1) layer modules, wherein the layer modules and the electrically conductive layers are arranged alternatingly such that each electrically conductive layer is arranged between two layer modules, where n is a natural number greater than or equal to 1. At least one of the layer modules is formed as a layer based on a transparent conductive oxide, and the remaining layer modules, if present, are formed as dielectric layers or layer sequences.

24 Claims, 3 Drawing Sheets

(56)     References Cited

FOREIGN PATENT DOCUMENTS

Figure 1:
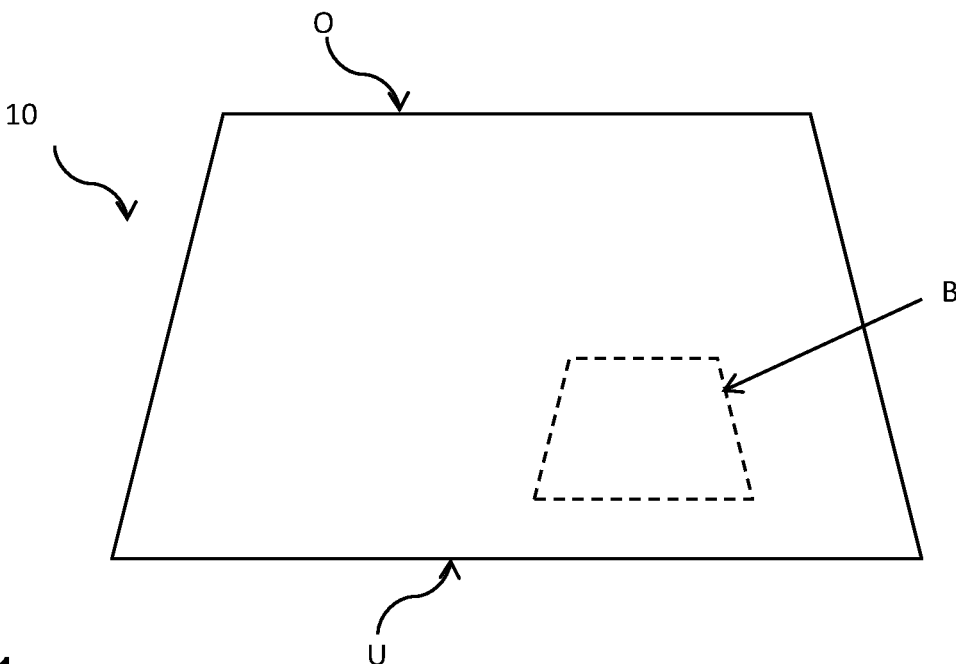

| | | | | | |
|---|---|---|---|---|---|
| CN | 109073809 | A | 12/2018 | | |
| CN | 110520295 | A | 11/2019 | | |
| CN | 110520782 | A | 11/2019 | | |
| CN | 111433023 | A | 7/2020 | | |
| DE | 10 2014 220189 | A1 | 4/2016 | | |
| EP | 1 880 243 | A2 | 1/2008 | | |
| EP | 1 800 855 | B1 | 2/2013 | | |
| JP | H04-074737 | A | 3/1992 | | |
| JP | H04-114531 | U | 10/1992 | | |
| WO | WO 2006/122305 | A2 | 11/2006 | | |
| WO | WO 2009/071135 | A1 | 6/2009 | | |
| WO | WO-2019-046157 | * | 3/2019 | ............ | G03C 27/12 |
| WO | WO 2019/046157 | A1 | 3/2019 | | |
| WO | WO 2019/110172 | A1 | 6/2019 | | |
| WO | WO 2019/179683 | A1 | 9/2019 | | |
| WO | WO 2020/083649 | A1 | 4/2020 | | |
| WO | WO 2020/094422 | A1 | 5/2020 | | |
| WO | WO 2020/094423 | A1 | 5/2020 | | |
| WO | WO 2021/004685 | A1 | 1/2021 | | |
| WO | WO 2021/104800 | A1 | 6/2021 | | |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediaturn.ub.turn.de/1079689?id= 1079689&change_language=en>. (English abstract on p. 5 of document).

First Office Action as issued in Chinese Patent Application No. 202180002362.2, dated Oct. 24, 2025.

\* cited by examiner

PROJECTION ARRANGEMENT FOR A HEAD-UP DISPLAY (HUD) WITH P-POLARISED RADIATION AND MULTILAYER REFLECTIVE COATING FOR VEHICLE GLAZING

CROSS-REFERENCE TO RELATED APPLICATIONS

This application is the U.S. National Stage of PCT/EP2021/066099, filed Jun. 15, 2021, which in turn claims priority to European patent application number 20188327.9 filed Jul. 29, 2020. The content of these applications are incorporated herein by reference in their entireties.

The invention relates to a projection arrangement for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the driver's field of vision, for example, the current driving speed, navigation or warning messages, which the driver can perceive without having to divert his glance from the road. Head-up displays can thus contribute significantly to an increase in traffic safety.

HUD projectors are predominantly operated with s-polarised radiation and irradiate the windshield at an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection arrangements that work with windshields without wedge films. For example, it is possible to operate the HUD projector with p-polarised radiation, which is not significantly reflected by the pane surfaces. Instead, the windshield has a reflection coating as a reflection surface for the p-polarised radiation. DE102014220189A1 discloses such an HUD projection arrangement that is operated with p-polarised radiation. Proposed, among other things, as a reflecting structure is a single metallic layer with a thickness of 5 nm to 9 nm, made, for example, of silver or aluminium. Further HUD projection arrangement with reflecting coatings relative to p-polarised radiation that have a single metallic layer are known, for example, from WO2021/004685A1 and WO2021/104800A1.

The coatings with a single metallic layer can have good reflecting properties relative to the p-polarised radiation of the projector. However, often the coating should also have reflecting properties relative to infrared solar radiation to avoid heating the interior. However, the effectiveness of coatings with a single metallic layer, in particular a silver layer, is quite limited in this regard. An improvement would, in principle, be possible through the selection of a very thick metallic layer. However, there are narrow limits to the design freedom in this regard because the metallic layer also reduces the transmittance in the visible spectral range, on which high requirements are placed in windshields.

Coatings with multiple metallic layers separated from one another by dielectric layers have also been proposed. Reference is made by way of example to WO2019046157A1, WO2019179683A1, WO2020094422A1, and WO2020094423A1. Such coatings enable better IR-reflecting properties along with comparatively high transmittance in the visible spectral range. However, the deposition of such relatively complex coatings with a large number of individual layers is technically complex.

The design of the coating can also not be carried out merely under consideration of IR reflexion and transmittance in the visible spectral range. Use as a reflecting coating for the radiation of an HUD projector places further requirements on the coating, in particular high reflectance relative to p-polarised radiation in the visible spectral range and the smoothest possible reflection spectrum, i.e., the most consistent possible reflectance to enable the most colour-neutral display of the HUD projection possible. US2017242247A1 discloses, for example, another HUD projection arrangement with a reflection coating for p-polarised radiation, which can contain multiple conductive silver layers, and dielectric layers in addition. However, the reflection spectrum has a distinctly curved shape in the relevant spectral range such that reflectance is relatively strongly wavelength-dependent.

WO2019179683A1 discloses an HUD projection arrangement, wherein the windshield has a reflection coating for the p-polarised HUD radiation that comprises four electrically conductive silver layers and intervening dielectric layer sequences. The dielectric layer sequences can contain dielectric matching layers made of aluminium-doped zinc oxide.

Consequently, there is a need for further improved projection arrangements for p-polarised HUDs with reflection coatings. The coating should ensure high transmittance in the visible spectral range and high reflectance relative to infrared components of solar radiation as well as high and the most consistent possible reflectance relative to the p-polarised radiation of the HUD projector in the visible spectral range. The object of the present invention is to provide such an improved projection arrangement.

The object of the present invention is accomplished according to the invention by a projection arrangement in accordance with claim 1. Preferred embodiments are apparent from the dependent claims.

The projection arrangement according to the invention for a head-up display (HUD) includes at least a composite pane that is provided with a reflection coating and a projector (HUD projector). As is usual with HUDs, the projector irradiates a region of the composite pane where the radiation is reflected in the direction of the viewer (driver), generating a virtual image, which the viewer perceives, from his perspective, as behind the composite pane. The region of the composite pane that can be irradiated by the projector is referred to as an HUD region. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by adjustment of the mirrors, with the entire area thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The composite pane comprises an outer pane and an inner pane that are joined to one another via a thermoplastic intermediate layer. The composite pane is intended, in a window opening of a vehicle, to separate the interior from the external surroundings. In the context of the invention, the term "inner pane" refers to the pane of the composite pane facing the vehicle interior. The term "outer pane" refers to the pane facing the external surroundings.

The composite pane according to the invention is preferably a windshield (front pane) of a vehicle on land, in the water, or in the air, in particular the windshield of a motor vehicle, for example, a passenger car or a lorry, or the front pane of an aircraft, watercraft, or rail vehicle, in particular a train. HUDs, in which the projector radiation is reflected on a windshield to produce an image perceptible for the driver (viewer), are quite common. In principle, however, it is also conceivable to project the HUD projection onto other panes, in particular vehicle windows, for example, onto a side window or a rear window. For example, the HUD of a side window can be used to note people or other vehicles with which a collision threatens, provided their position is detected by cameras or other sensors. An HUD of a rear window can provide information for the driver when moving in reverse.

The composite pane has an upper edge and a lower edge as well as two side edges extending therebetween. "Upper edge" refers to that edge that is intended to point upward in the installed position. "Lower edge" refers to that edge that is intended to point downward in the installed position. In the case of a windshield, the upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is directed at the HUD region of the composite pane. The radiation of the projector is at least partially, preferably predominantly, particularly preferably essentially completely p-polarised. The reflection coating is suitable for reflecting p-polarised radiation. As a result, a virtual image that can be perceived by the driver of the vehicle, from his perspective, as behind the composite pane is generated from the projector radiation.

The reflection coating is a thin-film coating, i.e., a layer sequence of thin individual layers, which can also be referred to as a "thin-film stack". The reflection coating comprises n electrically conductive layers based on silver (in the following, also referred to as "silver layers") and (n+1) layer modules, where n is a natural number greater than or equal to 1. The layer modules and the electrically conductive layers are arranged alternatingly such that each electrically conductive layer is arranged between two layer modules. The reflection coating thus has, from bottom to top, at least the structure "layer module—electrically conductive layer—layer module", with further "electrically conductive layer—layer module" units possibly following above.

The term "layer module" refers to an individual layer or a plurality of layers that are present in addition to the silver layers, in particular that form the upper and lower end of the layer structure and separate adjacent silver layers from one another when multiple silver layers are present. Coatings of this type are known. Conventionally, the layer modules are implemented as dielectric layers or layer sequences. In contrast, according to the invention, at least one of the layer modules is implemented as a layer based on a transparent electrically conductive oxide (TCO, transparent conductive oxide) (in the following, also referred to as "TCO layer").

The layer modules serve to protect the silver layers against corrosion and influence the optical properties of the reflection coating. Until now, the prevailing view seemed to be that these layer modules had to be designed as dielectric layers or layer sequences. The inventors found that the function can also be fulfilled by TCO layers. Furthermore, the TCO layers have the advantage that they reduce the energy input into the vehicle interior due to their reflecting properties in the infrared spectral range (IR range). In contrast, they are largely transparent in the visible spectral range such that the light transmittance is not significantly reduced. The transmittance-reducing effect is in particular less than that of silver layers. Moreover, the layer structure according to the invention makes possible reflection coatings with high and comparatively consistent reflectivity relative to p-polarised radiation in the visible spectral range, making it possible to realise an HUD projection that is both intense and colour-neutral. These are major advantages of the present invention.

One or more layer modules can be formed as a TCO layer. If other layer modules are present in addition to the layer modules formed as a TCO layer, these are each formed as a dielectric layer or layer sequence. In a preferred embodiment, exactly one of the layer modules is formed as a TCO layer, whereas all remaining layer modules are formed as dielectric layers or layer sequences. Since dielectric layers can typically be deposited at a lower cost than TCO layers, such a composite pane can be produced more economically. In addition, the dielectric layers can also provide the coating with advantageous properties, for example, a barrier effect against the diffusion of alkali ions. Because of this barrier effect, which can prevent diffusion of alkali ions from the glass into the silver layer, the lowest layer module under the lowest silver layer is preferably formed as a dielectric layer or layer sequence.

According to the inventive concept, the dielectric layers, which conventionally form the layer modules, are replaced in the TCO layer module as a whole by the TCO layer. The layer module is thus completely formed as a TCO layer and contains no other layers apart from the TCO layer, in particular no dielectric layers. This means that no dielectric layer is arranged between the TCO layer and the overlying electrically conductive layer, if there is one, and between the TCO layer and the electrically conductive layer positioned below it, if there is one. If the TCO layer module is the uppermost layer module, preferably, no dielectric layer is arranged above the TCO layer and between the TCO layer and the silver layer positioned below it. If the TCO layer module is the lowest layer module, preferably no dielectric layer is arranged below the TCO layer and between the TCO layer and silver layer positioned above it.

Preferably, the reflection coating consists of the silver layers and the layer modules and has no other layers. Very thin, metal-containing blocking layers having a thickness of less than 1 nm, which can optionally be present between the silver layers and the adjacent layer modules are an exception to this. The reflection coating thus preferably has, besides the silver layers and the layer modules, no other layers having a thickness of more than 1 nm. In other words, the reflection coating preferably consists of the silver layers and the layer modules as well as optional blocking layers having a thickness of less than 1 nm.

The specification of layer thicknesses or thicknesses refers, unless otherwise indicated, to the geometric thicknesses of a layer.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer.

When a layer is based on a material, the layer consists for the most part of this material, in particular substantially of this material, in addition to any impurities or dopants.

The at least one electrically conductive layer is based on silver. The at least one conductive layer preferably contains at least 90 wt.-% silver, particularly preferably at least 99 wt.-% silver, most particularly preferably at least 99.9 wt.-% silver. The silver layer can have dopants, for example, paladium, gold, copper, or aluminium. The thickness of the silver layer is preferably at least 7 nm, particularly preferably at least 9 nm. The thickness of the silver layer is preferably at most 14 nm. in this range for the thickness particularly advantageous properties of the reflection coating can be achieved. On the one hand, the silver layers are thick enough to have significant IR-reflecting properties and not lead to dewetting problems during a temperature treatment. Here, "dewetting" refers to island-like accumulation of the silver instead of a homogeneous layer, which can occur with very thin silver layers. On the other hand, the silver layers are thin enough to ensure high light transmittance. The desired reflecting properties relative to p-polarised radiation can likewise be realised advantageously in this range for the thickness of the silver layer. If the reflection coating has multiple silver layers, the above preferred ranges for the layer thickness apply, in principle, to each of the silver layers.

In an advantageous embodiment, the number n is equal to 1. The reflection coating then comprises exactly one single silver layer and two layer modules, namely one layer module each above and below the silver layer. The reflection coating thus does not contain more than one silver layer, and no additional silver layers are arranged above or below the reflection coating. It is a particular advantage of the invention that the required properties can be achieved with a simple structure having only one silver layer. As a result, the deposition of the coating is, comparatively, technically simple and economical, and the single silver layer does not excessively reduce the light transmittance. The reflection coating then has the following basic layer structure, starting from the substrate on which it is deposited ("from bottom to top").

layer module
electrically conductive layer based on silver
layer module

The following layer structures are possible from bottom to top:

dielectric layer/layer sequence—silver layer—TCO layer
TCO layer—silver layer—dielectric layer/layer sequence
TCO layer—silver layer—TCO layer The two first-mentioned layer structures with only one TCO layer are preferred. A TCO layer below the silver layer offers the advantage that silver layers form particularly good layer properties when they are deposited on TCO layers due to a similar crystal structure. A TCO layer above the silver layer offers the advantage that its degree of oxidation can be well adjusted, which, in turn, influences its barrier effect against oxygen and thus on the oxidation of the silver layer, in particular during a temperature treatment. In particular, a substoichiometric TCO layer can prevent the corrosion of the silver because the oxygen necessary for this is absorbed by the oxygen-deficient TCO layer. A dielectric layer module below the silver layer further has the advantage that it can more effectively prevent the diffusion of alkali ions from the glass into the silver layer than a TCO layer module. The properties of the silver layer can thus be advantageously influenced.

The reflection coating can also include more than one silver layer, for example, two silver layers. The reflection coating then has the following basic layer structure, starting from the substrate on which it is deposited ("from bottom to top"):

layer module
electrically conductive layer based on silver
layer module
electrically conductive layer based on silver
layer module Preferably, here as well, only one of the layer modules is formed as a TCO layer, whereas the two other layer modules are formed as dielectric layers or layer sequences. Particularly preferably, the layer module between the two electrically conductive layers is formed as a TCO layer.

A reflection coating with multiple silver layers, in particular two silver layers, can in particular be advantageous when the individual silver layers are to be formed with low thickness, for example, to increase light transmittance. The thickness of the individual silver layers is particularly preferably from 7 nm to 10 nm.

At least one layer module is formed according to the invention as a TCO layer. In a particularly preferred embodiment, the TCO is indium tin oxide (ITO). ITO has particularly good IR-reflecting properties and can be deposited easily, in particular by means of cathodic sputtering. In addition, ITO exhibits advantageous interactions with silver layers. For example, silver layers with high quality can be deposited on ITO layers due to very similar crystal structure. However, in principle, other TCOs can also be used, for example, mixed indium-zinc oxide (IZO), aluminium-doped zinc oxide (AZO), gallium-doped zinc oxide (GZO), fluorine-doped tin oxide (FTO, $SnO_2$:F), antimony-doped tin oxide (ATO, $SnO_2$:Sb), or niobium-doped titanium oxide ($TiO_2$:Nb).

The thickness of the at least one TCO layer is preferably from 20 nm to 100 nm, preferably from 30 nm to 80 nm. This provides good results in terms of the IR-reflecting properties and the reflecting properties relative to the p-polarised radiation of the HUD projector. The TCO layer is in particular thin enough to not reduce light transmittance to a critical extent, but, on the other hand, thick enough to effectively protect the silver layer against corrosion. If the reflection coating has multiple TCO layers, the above-described preferred ranges apply to each of the TCO layers.

The TCO layer is preferably substoichiometric, i.e., has substoichiometric oxygen contact. Oxygen is, for example, then absorbed by the substoichiometric TCO layers during a temperature treatment and cannot react with the silver layers.

In an advantageous embodiment, the reflection coating includes at least one blocking layer based on a metal or a metal alloy (metallic blocking layer). The blocking layer is preferably in direct contact with a silver layer. Preferably, the blocking layer is arranged above the silver layer. The blocking layer is then arranged between the silver layer and the overlying layer module and serves as oxidation protection of the silver layer in particular during temperature treatments of the coated pane, as typically occurs within bending processes. Alternatively, or additionally, there can also be a blocking layer below the silver layer. The blocking layer is then arranged between the silver layer and the underlying layer module. Such a blocking layer below the silver layer improves the adhesion of the silver layer. If the reflection coating includes more than one silver layer, such a blocking layer is associated with at least one silver layer, particularly preferably with each silver layer. The blocking layer preferably has a thickness of less than 1 nm, particularly preferably from 0.1 nm to 0.5 nm. The blocking layer can be formed, for example, based on nickel (Ni), chromium (Cr), niobium (Nb), titanium (Ti), or mixtures or alloys thereof. The blocking layer is preferably formed based on titanium or a nickel-chromium alloy.

For a reflection coating with a single silver layer, the following particularly preferred layer sequences result ("from bottom to top"):

dielectric layer/layer sequence—(optional blocking layer)—silver layer—blocking layer—TCO layer TCO layer—(optional blocking layer)—silver layer—blocking layer—dielectric layer/layer sequence TCO layer—(optional blocking layer)—silver layer—blocking layer—TCO layer Those layer modules that are not formed as a TCO layer are formed as dielectric layers or layer sequences (dielectric layer modules). The optical thickness of the dielectric layer modules is preferably from 50 nm to 150 nm, particularly preferably from 60 nm to 120 nm, most particularly preferably from 70 nm to 100 nm. Particularly advantageous optical properties of the reflection coating are thus achieved. The dielectric layers have, relative to the silver layers, an anti-reflective action such that light transmittance is increased, and the influence the reflection spectrum relative to the radiation of the HUD projector. In the range mentioned for the optical thickness, advantageous light transmittance is achieved as well as pronounced and uniform (colour-neutral) reflection relative to the radiation of the HUD projector. The optical thickness is the product of the geometric thickness and the refractive index (at 550 nm). The optical thickness of a layer sequence is calculated as the sum of the optical thicknesses of the individual layers.

The dielectric layer modules can be formed as dielectric individual layers or as dielectric layer sequences. The dielectric layers can be formed, for example, based on silicon oxide, silicon nitride, zinc oxide, tin oxide, tin-zinc oxide, mixed silicon-metal nitrides such as silicon-zirconium nitride, zirconium oxide, niobium oxide, hafnium oxide, tantalum oxide, tungsten oxide, or silicon carbide.

In an advantageous embodiment, the reflection coating includes no dielectric layers whose refractive index is less than 1.9. All dielectric layers of the reflection coating thus have a refractive index of at least 1.9. Since, in particular, silicon oxide layers, which have low deposition rates in magnetron-enhanced cathodic deposition, are considered for low-refractive-index layers with a refractive index of less than 1.9, the reflection coating according to the invention can thus be produced quickly and economically.

In the context of the present invention, refractive indices are in principle indicated in relation to a wavelength of 550 nm. The refractive index can, for example, be determined by means of ellipsometry. Ellipsometers are commercially available, for example, from the company Sentech.

In an advantageous embodiment, each dielectric layer module includes a dielectric layer, which can be referred to as an anti-reflection layer and is preferably based on an oxide, for example, tin oxide, and/or a nitride, for example, silicon nitride, particularly preferably based on silicon nitride. Silicon nitride has proved itself due to its optical properties, its easy availability, and its high mechanical and chemical stability. The silicon is preferably doped, for example, with aluminium or boron. If the dielectric layer module is the uppermost layer module above the uppermost silver layer, the anti-reflection layer is, in the case of a layer sequence, preferably the uppermost layer of the layer sequence. In all other cases (dielectric layer module as the lowest layer module or as a layer module situated between two silver layers), the anti-reflection layer is, in the case of a layer sequence, preferably the lowest layer of the layer sequence. In addition to the advantageous optical properties, such anti-reflection layers, in particular based on silicon nitride, have a good barrier effect against the diffusion of ions (for example, alkali ions from the glass panes) such that the anti-reflection layer chemically protects the functional silver layer.

In addition to the anti-reflection layer, other dielectric layers can optionally be present, preferably those with a refractive index of at least 1.9. In a particularly advantageous embodiment, the dielectric layer module includes a dielectric matching layer, which improves the reflectivity of the silver layer. The matching layer is preferably based on zinc oxide, particularly preferably zinc oxide $ZnO_{1-\delta}$ with $0 < \delta < 0.01$. The matching layer further preferably contains dopants. The matching layer can, for example, contain aluminium-doped zinc oxide (ZnO:Al). The zinc oxide is preferably deposited substoichiometrically with respect to oxygen in order to avoid a reaction of excess oxygen with the silver-containing layer. The matching layer is preferably arranged between the silver layer and the anti-reflection layer. The matching layer is advantageous in terms of the crystal structure of the overlying silver layer. In addition, it can protect the silver layer against corrosion, in particular if it is substoichiometrically deposited and, consequently, able to absorb excess oxygen and to prevent it from reacting with the silver layer.

The dielectric layer module can also include a refractive-index-enhancing layer that has a higher refractive index than the anti-reflection layer. As a result, the optical properties can be further improved and fine-tuned, in particular the reflection properties. The refractive-index-enhancing layer is, in particular, responsible for better anti-reflection of the silver layers such that light transmittance is increased. The refractive-index-enhancing layer preferably has a refractive index of at least 2.1. The refractive-index-enhancing layer is preferably based on a mixed silicon-metal nitride such as mixed silicon-zirconium nitride, mixed silicon-titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. Alternative materials considered are, for example, tungsten oxide $(WO_3)$, niobium oxide $(Nb_2O_5)$, bismuth oxide $(B_2O_3)$, titanium oxide $(TiO_2)$, and/or aluminium nitride (AlN), The refractive-index-enhancing layer are preferably arranged between the anti-reflection layer and the silver layer or between the matching layer (if present) and the anti-reflection layer.

The thickness of the matching layer, if there is one, is preferably from 5 nm to 20 nm, particularly preferably from 8 nm to 12 nm. The thickness of the refractive-index-enhancing layer is preferably from 5 nm to 20 nm, particularly preferably from 8 nm to 12 nm. The thickness of the anti-reflection layer is preferably selected so as to achieve, overall, an optical thickness of the entire layer sequence within the aforementioned ranges. If, in addition to the anti-reflection layer, both a matching layer and a refractive-index-enhancing layer are present, the thickness of the anti-reflection layer is particularly preferably from 10 nm to 40 nm.

In a preferred embodiment, the dielectric layer sequences have no further layers other than said anti-reflection layer, the optional refractive-index-enhancing layer, and the optional matching layer such that the dielectric layer sequences consist of said layers.

If multiple dielectric layer modules are present, the above statements concerning preferred embodiments apply independently of one another to the layer modules.

The materials mentioned in the present description can be deposited stoichiometrically, substoichiometrically, or superstoichiometrically. The materials can have dopants, in particular the aluminium, boron, zirconium, or titanium. The dopants can provide inherently dielectric materials with a certain electrical conductivity. The person skilled in the art will nevertheless identify them as dielectric layers in terms of their function, as is usual in the field of thin layers. The material of the dielectric layers preferably has electrical conductivity (reciprocal of specific resistance) of less than $10^{-4}$ S/m. The material of the electrically conductive layers (in particular TCO layers, silver layers) preferably has electrical conductivity greater than $10^{-4}$ S/m.

In one embodiment of the invention, there is at least one dielectric layer module. The at least one dielectric layer module is formed from exactly one dielectric layer, preferably an anti-reflection layer with a refractive index of at least 1.9, particularly preferably based on silicon nitride. The thickness of the anti-reflection layer is preferably from 25 nm to 75 nm, particularly preferably from 30 nm to 60 nm, most particularly preferably from 35 nm to 50 nm. In the preferred case of a single silver layer and a single TCO layer module, this yields the preferred layer sequences, starting from the substrate ("from bottom to top"):

anti—reflection layer—silver layer—TCO layer

TCO layer—silver layer—anti-reflection layer

In another embodiment of the invention, there is at least one dielectric layer module. The at least one dielectric layer module is formed from exactly two dielectric layer, preferably one anti-reflection layer and one matching layer with a refractive index of at least 1.9 in each case. The anti-reflection layer is particularly preferably based on silicon nitride; the matching layer, based on zinc oxide. The thickness of the matching layer is particularly preferably from 5 nm to 20 nm, in particular from 8 nm to 12 nm The thickness of the anti-reflection layer is preferably selected such that the dielectric layer module has, overall, an optical thickness from 50 nm to 150 nm, particularly preferably from 60 nm to 120 nm, most particularly preferably from 70 nm to 100 nm. The matching layer is preferably arranged between the anti-reflection layer and the silver layer. In the preferred case of a single silver layer and a single TCO layer module, this yields the preferred layer sequences, starting from the substrate ("from bottom to top"):

anti-reflection layer—matching layer—silver layer—TCO layer

TCO layer—silver layer—matching layer—anti-reflection layer

In another embodiment of the invention, there is at least one dielectric layer module. The at least one dielectric layer module is formed from exactly three dielectric layer, preferably one anti-reflection layer with a refractive index of at least 1.9, one refractive-index-enhancing layer with a refractive index of at least 2.1, and one matching layer with a refractive index of at least 1.9. The anti-reflection layer is particularly preferably based on silicon nitride; the refractive-index-enhancing layer, based on a mixed silicon-metal nitride (such as mixed silicon-zirconium nitride, mixed silicon-titanium nitride, or mixed silicon-hafnium nitride); the matching layer, based on zinc oxide. The thickness of the matching layer and of the refractive-index-enhancing layer is, in each case, particularly preferably from 5 nm to 20 nm, in particular from 8 nm to 12 nm The thickness of the anti-reflection layer is preferably selected such that the dielectric layer module, overall, has an optical thickness from 50 nm to 150 nm, particularly preferably from 60 nm to 120 nm, most particularly preferably from 70 nm to 100 nm. It is most particularly preferably from 10 nm to 40 nm. The matching layer preferably has the least distance from the adjacent silver layer, whereas the refractive-index-enhancing layer is arranged between the matching layer and the anti-reflection layer. In the preferred case of one single silver layer and one single TCO layer module, this yields the preferred layer sequences, starting from the substrate ("from bottom to top"):

anti-reflection layer—refractive-index-enhancing layer—matching layer—silver layer—TCO layer TCO layer—silver layer—matching layer—refractive-index-enhancing layer—anti-reflection layer In the three embodiments described above, the layer sequences preferably consist exclusively of the layers mentioned, with the additional optional presence of a metallic blocking layer having a thickness of less than 1 nm between the silver layer and the overlying and/or the underlying layer module. The blocking layer is preferably arranged directly above the silver layer, where it is particularly effective. This yields the preferred layer sequences, starting from the substrate ("from bottom to top"):

anti-reflection layer—silver layer—blocking layer—TCO layer

TCO layer—silver layer—blocking layer—anti-reflection layer anti-reflection layer—matching layer—silver layer—blocking layer—TCO layer TCO layer—silver layer—blocking layer—matching layer—anti-reflection layer anti-reflection layer—refractive-index-enhancing layer—matching layer—silver layer blocking layer—TCO layer TCO layer—silver layer—blocking layer—matching layer—refractive-index-enhancing layer—anti-reflection layer in each case, an additional blocking layer can optionally be arranged directly below the silver layer.

With the coating according to the invention, advantageous reflecting properties relative to p-polarised radiation can be realised such that a high-intensity HUD projection is made possible. The integrated light reflection of the composite pane relative to p-polarised radiation, measured with a p-polarised light source of the illuminant A at an angle of incidence of 65° and a viewing angle of 65°, in each case relative to the interior-side surface normal, is preferably at least 10%, particularly preferably at least 15%, most particularly preferably at least 20%. The interior-side surface normal is the surface normal of the interior-side surface of the inner pane. Consequently, the light reflection can also be referred to as "interior-side light reflection". The angle of incidence of 65° corresponds to the irradiation with conventional HUD projectors. The light reflection is measured at a point within the HUD region, preferably in the geometric centre of the HUD region.

In order to achieve the most colour-neutral display of the HUD projection, the reflection spectrum in the visible spectral range should be as uniform as possible. This is in particular the case when the reflection colour in the L*a*b* colour space has an a*-value and a b*-value of less than 5. Here again, the reflection colour is measured with a p-polarised light source of the illuminant A at an angle of incidence of 65° and a viewing angle of 65°, relative in each case to the interior-side surface normal.

Furthermore, the coating according to the invention effectively reduces the heat input into the vehicle interior due to the TCO layer present in addition to the silver layer, which represents a major advantage of the present invention compared to the prior art. The total incident solar energy, expressed as a TTS value per ISO 13837, is preferably at most 55%.

The reflection coating is preferably applied to one of the surfaces of the two panes facing the intermediate layer, i.e., the interior-side surface of the outer pane or the exterior-side surface of the inner pane. Alternatively, the reflection coating can also be arranged within the thermoplastic intermediate layer, for example, applied to a carrier film that is arranged between two thermoplastic bonding films. The reflection coating is transparent, which means, in the context of the invention, that it has average transmittance in the visible spectral range of at least 70%, preferably at least 75%, and thus does not substantially restrict vision through the pane. For the HUD projection, it is basically sufficient for the HUD region of the composite pane to be provided with the reflection coating. However, since the reflection coating is also intended to reduce the energy input into the vehicle interior, the composite pane is preferably provided with the reflection coating over its entire area. In an advantageous embodiment of the invention, at least 80% of the pane surface is provided with the reflection coating according to the invention. In particular, the reflection coating is applied to the pane surface over its entire area with the exception of a peripheral edge region and, optionally, a local region that are intended to ensure the transmittance of electromagnetic radiation through the composite pane as communication windows, sensor windows, or camera windows, and, consequently, are not provided with the reflection coating. The peripheral uncoated edge region has, for example, a width of up to 20 cm. It prevents direct contact of the reflection coating with the surrounding atmosphere such that the reflection coating is protected, in the interior of the composite pane, against corrosion and damage.

The projector is arranged in the interior relative to the composite pane and irradiates the composite pane via the interior-side surface of the inner pane. It is directed at the HUD region and irradiates it to generate the HUD projection. According to the invention, the radiation of the projector is at least partially p-polarised, i.e., has a p-polarised radiation component. The radiation of the projector is preferably predominantly p-polarised, i.e., has a p-polarised radiation component greater than 50%. The higher the proportion of the p-polarised radiation in the total radiation of the projector, the higher the intensity of the desired projection image and the weaker the intensity of undesirable reflections on the surfaces of the composite pane. The proportion of p-polarised radiation of the projector is preferably at least 70%, particularly preferably at least 80%, and in particular at least 90%. In a particularly advantageous embodiment, the radiation of the projector is essentially purely p-polarised—the p-polarised radiation proportion is thus 100% or deviates only insignificantly therefrom. The indication of the polarisation direction is based here on the plane of incidence of the radiation on the composite pane. The expression "p-polarised radiation" refers to radiation whose electric field oscillates in the plane of incidence. "S-polarised radiation" refers to radiation whose electric field oscillates perpendicular to the plane of incidence. The plane of incidence is spanned by the vector of incidence and the surface normal of the composite pane at a point within the HUD region, preferably in the geometric centre of the HUD region. Due to the usual curvature of the pane in the vehicle sector, which affects the plane of incidence and thus the definition of the polarisation, the ratio of p-polarised radiation to s-polarised radiation can be different from this reference point at other locations.

The p-polarised radiation emitted by the projector irradiates the HUD region to generate the HUD projection during operation of the HUD. The radiation of the projector is in the visible spectral range of the electromagnetic spectrum—typical HUD projectors operate with the wavelengths 473 nm, 550 nm, and 630 nm (RGB). Since the angle of incidence typical for HUD projection arrangements is relatively close to the Brewster angle for an air/glass transition (56.5° to 56.6°, soda lime glass, $n_2=1.51-1.52$), p-polarised radiation is hardly reflected by the pane surfaces. Ghost images due to reflection at the interior-side surface of the inner pane and the exterior-side surface of the outer pane thus occur only with low intensity. In addition to avoiding the ghost images, the use of p-polarised radiation also has the advantage that the HUD image is recognisable to wearers of polarisation-selective sunglasses, which typically allow only p-polarised radiation to pass and block s-polarised radiation.

The radiation of the projector preferably strikes the composite pane at an angle of incidence from 45° to 70°, in particular from 60° to 70°. In an advantageous embodiment, the angle of incidence deviates from Brewster's angle by at most 10°. The p-polarised radiation is then reflected only insignificantly at the surface of the composite pane such that no ghost image is generated. The angle of incidence is the angle between the vector of incidence of the projector radiation and the interior-side surface normal (i.e., the surface normal on the interior-side external surface of the composite pane) in the geometric centre of the HUD region. Ideally, the angle of incidence should be as close as possible to Brewster's angle. However, angles of incidence of 65°, which are common for HUD projection arrangements, are easily implemented in vehicles, and deviate only slightly from Brewster's angle can, for example, also be used such that the reflection of the p-polarised radiation increases only insignificantly.

Since the reflection of the projector radiation occurs substantially at the reflection coating and not at the external pane surfaces, it is not necessary to arrange the external pane surfaces at an angle relative to one another in order to avoid ghost images. "The external pane surfaces" refers here to the surfaces of the individual panes facing away from one another, i.e., the exterior-side surface of the outer pane and the interior-side surface of the inner pane. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the composite pane, just like the inner pane and the outer pane. A wedge-like intermediate layer would, in contrast, have a variable thickness, in particular an increasing thickness, in the vertical course between the lower edge and the upper edge of the composite pane. The intermediate layer is typically formed from at least one thermoplastic film. Since standard films are significantly more economical than wedge films, the production of the composite pane is more economical.

The reflection coating can also be used as a heatable coating. For this purpose, it must be electrically contacted so it can be connected to the voltage source, usually the on-board voltage of the vehicle. For connection to the voltage source, the coating is preferably provided with bus bars, which can be connected to the poles of the voltage source in order to introduce current into the coating over as much of the pane width as possible. The bus bars can, for example, be implemented as printed and baked conductors, typically in the form of a baked screen printing paste with glass frits and silver particles. However, alternatively, strips of an electrically conductive foil that are placed or glued onto the coating can be used as bus bars, for example, copper foil or aluminium foil. Typically, the two bus bars are positioned near two opposite side edges of the composite pane, for example, the upper and lower edge.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.9 mm, for example, those with the standard thicknesses of 1.6 mm or 2.1 mm.

The outer pane, the inner pane, and the thermoplastic intermediate layer can be clear and colourless, but also tinted or coloured. In a preferred embodiment, the total transmittance through the composite glass is greater than 70%, based on illuminant A, in particular when it is implemented as a windshield. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing.

In an advantageous embodiment, the outer pane is tinted or coloured. This can reduce the exterior-side reflectivity of the composite pane, as a result of which the impression of the pane is more pleasing for an outside viewer. However, to ensure the legally required light transmittance of 70% (total transmittance), the outer pane should preferably have light transmittance of at least 80%, particularly preferably of at least 85%, if the composite pane is intended to be used as windshields. The inner pane and the intermediate layer are preferably clear, i.e., not tinted or coloured. For example, green or blue coloured glass can be used as the outer pane.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from at least one thermoplastic film, in particular from a film based on PVB, EVA, or PU. In addition to the polymer, the film can contain other additives, in particular plasticisers. The thickness of the intermediate layer is preferably from 0.2 mm to 2 mm, particularly preferably from 0.3 mm to 1 mm.

The composite pane is can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating is preferably applied by physical vapour deposition (PVD) onto the inner pane, particularly preferably by cathodic sputtering ("sputtering"), most particularly preferably by magnetron-enhanced cathodic sputtering ("magnetron sputtering"). In principle, however, the coating can also be applied, for example, by chemical vapour deposition (CVD), for example, plasma-enhanced vapour deposition (PECVD), by vapour deposition, or by atomic layer deposition (ALD). The coating are preferably applied to the panes prior to lamination. Instead of applying the reflection coating on a pane surface, it can, in principle, also be provided on a carrier film that is arranged in the intermediate layer.

If the composite pane is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention also includes the use of a composite pane implemented according to the invention as a projection surface of a projection arrangement for a head-up display, wherein a projector whose radiation is at least partially, in particular predominantly, preferably essentially completely p-polarised is directed at the HUD region. The above-described preferred embodiments apply mutatis mutandis to the use.

The invention further includes the use of a projection arrangement according to the invention as an HUD in a vehicle on land, on water, or in the air, preferably a motor vehicle, rail vehicle, aircraft, or watercraft, in particular a passenger car or a lorry.

In the following, the invention is explained in detail with reference to drawings and exemplary embodiments. The drawings are schematic representations and are not true to scale. The drawings in no way restrict the invention.

Figure 2:
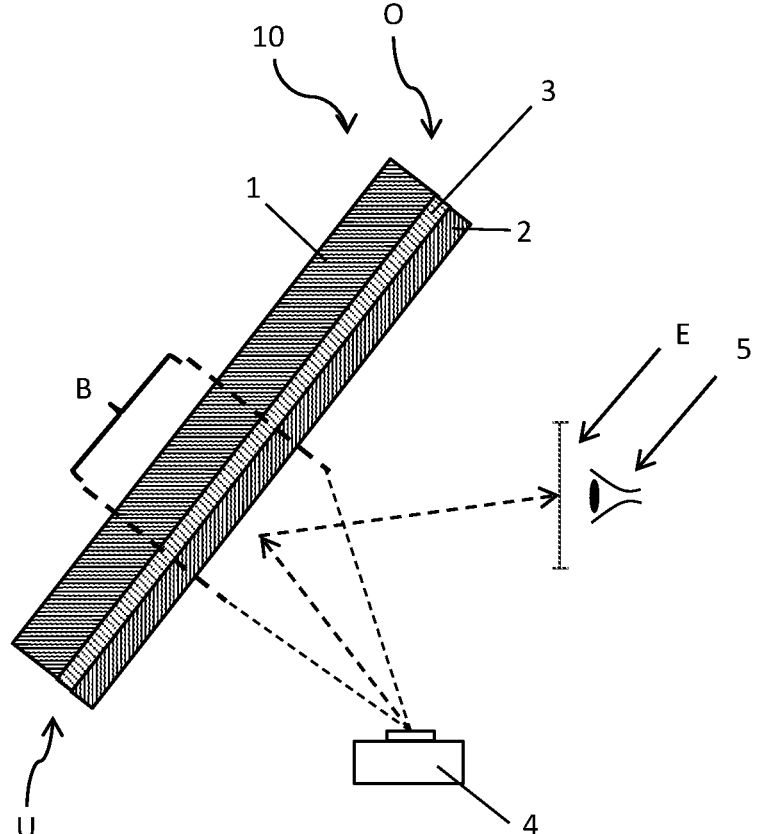
Figure 3:
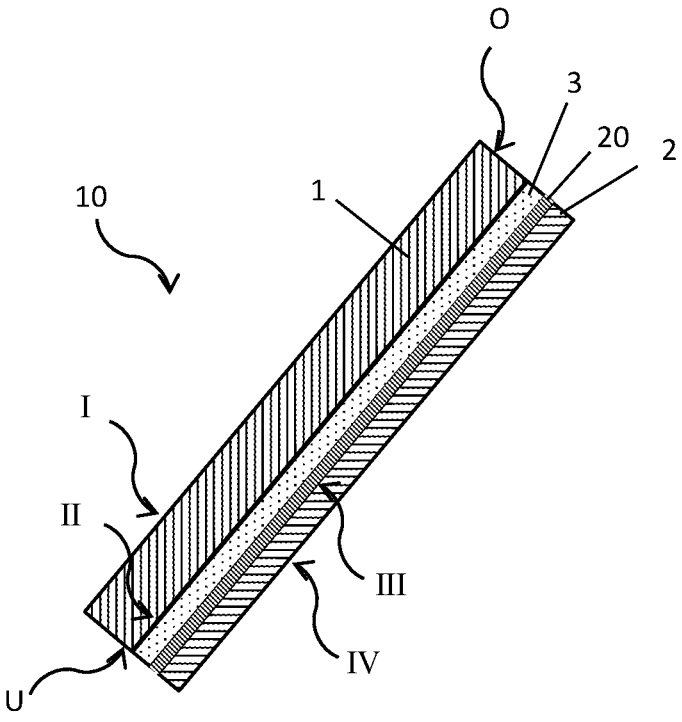
Figure 4:
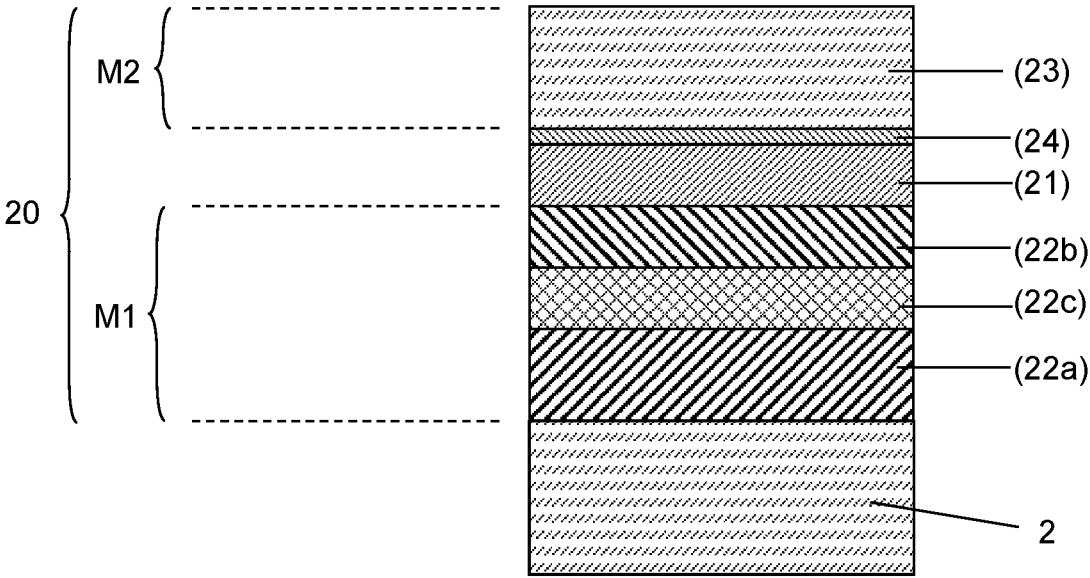
Figure 5:
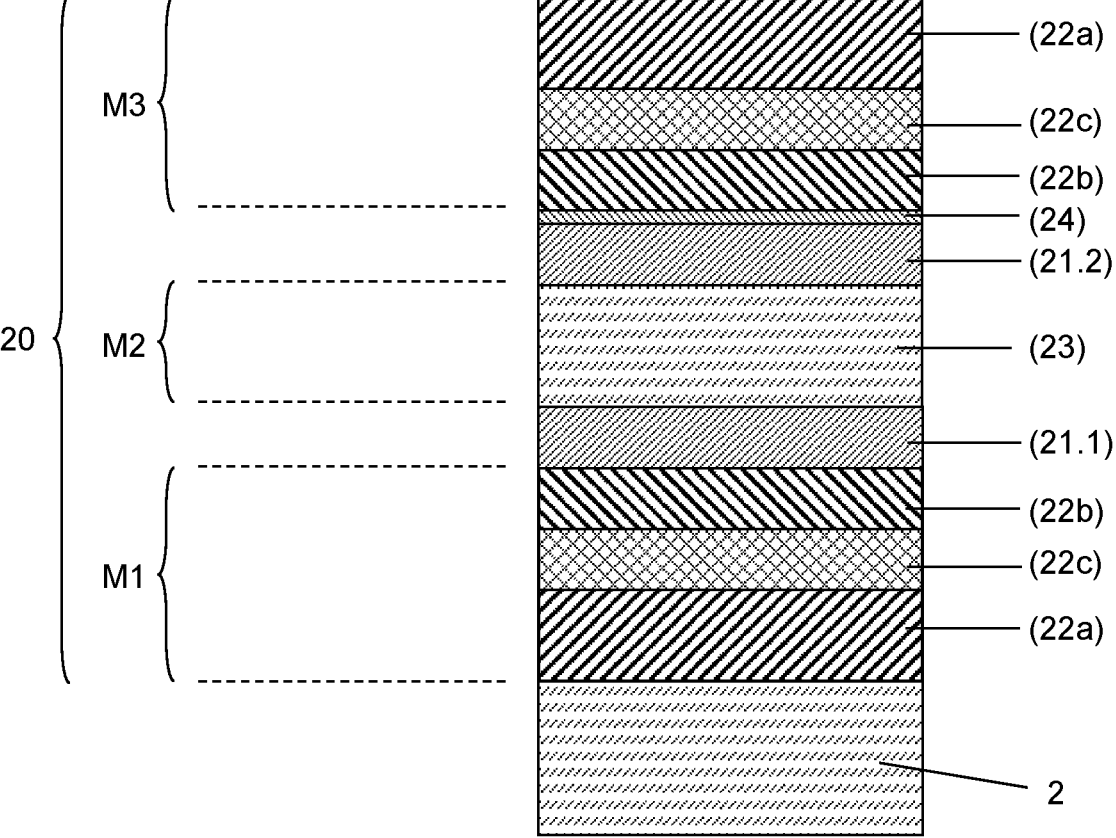

They depict:

FIG. 1 a plan view of a composite pane of a generic projection arrangement,

FIG. 2 a cross-section through a generic projection arrangement,

FIG. 3 a cross-section through a composite pane of a projection arrangement according to the invention, FIG. 4 a cross-section through an embodiment of the reflection coating according to the invention on an inner pane, FIG. 5 a cross-section through another embodiment of the reflection coating according to the invention on an inner pane.

FIG. 1 and FIG. 2 depict in each case a detail of a generic projection arrangement for an HUD. The projection arrangement comprises a composite pane 10, in particular the windshield of a passenger car. The projection arrangement also comprises an HUD projector 4 that is directed at a region of the composite pane 10. In this region, usually referred to as HUD region B, the HUD projector 4 can generate images that are perceived by a viewer 5 (vehicle driver) as virtual images on the side of the composite pane 10 facing away from him when his eyes are situated within the so-called eyebox E.

The composite pane 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the outside surroundings; the inner pane 2, the vehicle interior.

FIG. 3 depicts an embodiment of a composite pane 10 implemented according to the invention. The outer pane 1 has an exterior-side surface I that faces the outside surroundings in the installed position and an interior-side surface II that faces the interior in the installed position. Likewise, the inner pane 2 has an exterior-side surface III that faces the outside surroundings in the installed position and an interior-side surface IV that faces the interior in the installed position. The outer pane 1 and the inner pane 2 are made, for example, of soda lime glass and have, for example, a thickness of 2.1 mm in each case. The intermediate layer 3 is formed, for example, from a PVB film with a thickness of 0.76 mm. The PVB film has an essentially constant thickness, apart from any surface roughness common in the art—it is not implemented as a so-called wedge film.

The exterior-side surface III of the inner pane 2 is provided with a reflection coating 20 according to the invention, which is provided as a reflection surface for the projector radiation (and possibly, additionally, as an IR reflecting coating) or as a heatable coating. In addition, the reflection coating 20 is also to serve as a sun protection coating and reduce the energy input into the vehicle interior, which is caused in particular by the infrared radiation components of sunlight.

According to the invention, the radiation of the projector 4 is p-polarised, in particular essentially purely p-polarised. Since the HUD projector 4 irradiates the windshield 10 at an angle of incidence of about 65°, which is close to Brewster's angle, the radiation of the projector is only insignificantly reflected at the external surfaces I, IV of the composite pane 10. In contrast, the reflection coating 20 according to the invention is optimised for reflection of p-polarised radiation.

It serves as a reflection surface for the radiation of the HUD projector 4 to generate the HUD projection.

FIG. 4 depicts the layer sequence of an embodiment of the reflection coating 20 according to the invention on the inner pane 2. The reflection coating 20 is a stack of thin films. The reflection coating 20 comprises an electrically conductive layer 21 based on silver. A metallic blocking layer 24 is arranged directly above the electrically conductive layer 21. A first layer module M1 is arranged below the conductive layer 21. A second layer module M2 is arranged above the conductive layer 21 with the blocking layer 24.

The first layer module M1 is formed as a dielectric layer sequence, as is generally customary for generic coatings. The layer sequence consists, from bottom to top, of an anti-reflection layer 22a, a refractive-index-enhancing layer 22c, and a matching layer 22b.

In contrast, the second layer module M2 is s formed from a layer 23 based on a TCO, namely ITO, and contains no dielectric layers. The layer 23 serves the purpose of protecting the silver layer 21 against corrosion. In addition, it improves the IR reflectivity of the composite pane 10 such that the energy input into the vehicle interior can be further reduced. Furthermore, the layer 23 makes it possible to implement a reflection coating that has excellent reflection properties relative to the p-polarised radiation of the HUD projector 4 such that a high-intensity, colour-neutral display of the HUD projection is ensured. These are major advantages of the reflection coating 20 according to the invention with the TCO layer 23.

The layer sequence can be seen schematically in the figure. In Table 1, the layer sequence of a composite pane 10 with the reflection coating 20 on the exterior-side surface III of the inner pane 2 is presented, together with the materials and the layer thicknesses of the individual layers, for four Examples 1 through 4 according to the invention, which differ in the individual layer thicknesses. The dielectric layers can, independently of one another, be doped, for example, with boron or aluminium.

The optical thickness of a layer is in each case the product of the geometric thickness shown in the tables and the refractive index (SiN: 2.0; SiZrN: 2.2; ZnO: 2.0).

TABLE 1

| Material | Reference Characters | | | Example 1 | Example 2 | Example 3 | Example 4 |
|---|---|---|---|---|---|---|---|
| | | | | Layer Thickness | | | |
| Soda Lime Glass | 1 | | | 2.1 mm | 2.1 mm | 2.1 mm | 2.1 mm |
| PVB | 3 | | | 0.76 mm | 0.76 mm | 0.76 mm | 0.76 mm |
| ITO | 20 | M2 | 23 | 45.7 nm | 80 nm | 20 nm | 45 nm |
| NiCr | | | 24 | 0.3 nm | 0.3 nm | 0.3 nm | 0.3 nm |
| Ag | | | 21 | 13.5 nm | 12.5 nm | 12.5 nm | 12.5 nm |
| ZnO | | M1 | 22b | 10 nm | 10 nm | 10 nm | 10 nm |
| SiZrN | | | 22c | 10 nm | 10 nm | 10 nm | 13 nm |
| SiN | | | 22a | 15.9 nm | 15 nm | 25 nm | 25 nm |
| Soda Lime Glass | 2 | | | 2.1 mm | 2.1 mm | 2.1 mm | 2.1 mm |

Although reflection coatings 20 with a single conductive silver layer 21 are preferred, the invention is not limited thereto. The reflection coating can also contain multiple silver layers 21, separated from one another by layer modules. This is, in particular, advantageous when the individual silver layers 21 are to be designed thinner. Thus, high light transmittance along with high reflectivity for IR radiation can be realised.

FIG. 5 depicts the layer sequence of such a configuration of the reflection coating 20 according to the invention with two silver layers 21.1, 21.2 on the inner pane 2. The reflection coating 20 is a stack of thin films. A layer module M2 that is formed, according to the invention, from a single layer 23 based on a TCO, namely ITO and contains no dielectric layers is arranged between the two silver layers 21.1, 21.2. A dielectric layer module M1 that is formed as in FIG. 4 is arranged below the lower silver layer 21.1. A metallic blocking layer 24 is first arranged above the upper silver layer 21.2 and, above it, another dielectric layer module M3 is arranged. The layer sequence of the layer module M3 consists, from bottom to top, of a matching layer 22*b*, a refractive-index-enhancing layer 22*c*, and an anti-reflection layer 22*a*.

The layer sequence can be seen schematically in the figure. The layer sequence of a corresponding composite pane 10 with the reflection coating 20 on the exterior-side surface III of the inner pane 2 is presented, together with the materials and layer thicknesses of the individual layers, in Table 2 (Example 5).

TABLE 2

| Material¶ | Reference Characters | | | Layer Thickness Example 5 |
|---|---|---|---|---|
| Soda Lime Glass | 1 | | | 2.1 mm |
| PVB | 3 | | | 0.76 mm |
| SiN | 20 | M3 | 22a | 15 nm |
| SiZrN | | | 22c | 10 nm |
| ZnO | | | 22b | 10 nm |
| NiCr | | | 24 | 0.3 nm |
| Ag | | | 21.2 | 7 nm |
| ITO | | M2 | 23 | 35 nm |
| Ag | | | 21.1 | 7 nm |
| ZnO | | M1 | 22b | 10 nm |
| SiZrN | | | 22c | 10 nm |
| SiN | | | 22a | 20 nm |
| Soda Lime Glass | 2 | | | 2.1 mm |

A Comparative Example is shown in Table 3. Like the Example 1 through 4, the reflection coating 20 comprises a single silver layer 21 and two layer modules M1, M2. Both layer modules M1, M2 are formed as dielectric layer sequences and comprise, in each case, an anti-reflection layer 22*a*, a refractive-index-enhancing layer 22*c*, and a matching layer 22*b*.

TABLE 3

| Material | Reference Characters | | | Layer Thickness Comparative Example |
|---|---|---|---|---|
| Soda Lime Glass | 1 | | | 2.1 mm |
| PVB | 3 | | | 0.76 mm |
| SiN | 20 | M2 | 22a | 55 nm |
| SiZrN | | | 22c | 10 nm |
| ZnO | | | 22b | 10 nm |
| NiCr | | | 24 | 0.3 nm |
| Ag | | | 21 | 12.9 nm |
| ZnO | | M1 | 22b | 10 nm |
| SiZrN | | | 22c | 10 nm |
| SiN | | | 22a | 18 nm |
| Soda Lime Glass | 2 | | | 2.1 mm |

The arrangement of the TCO layer 23 in the Examples is to be understood as merely exemplary. According to the invention, any layer module can as TCO layer 23. Table 4 shows another Example according to the invention (Example 6). Here as well, the reflection coating comprises only one single silver layer 21, although, in contrast to Examples 1 through 4, the lower layer module M1 is formed as a TCO layer 23; and the upper layer module M2, as a dielectric layer sequence.

TABLE 4

| Material | Reference Characters | | | Layer Thickness Example 6 |
|---|---|---|---|---|
| Soda Lime Glass | 1 | | | 2.1 mm |
| PVB | 3 | | | 0.76 mm |
| SiN | 20 | M2 | 22a | 34 nm |
| SiZrN | | | 22c | 10 nm |
| ZnO | | | 22b | 10 nm |
| NiCr | | | 24 | 0.3 nm |
| Ag | | | 21.2 | 12.2 nm |
| ITO | | M1 | 23 | 35 nm |
| Soda Lime Glass | 2 | | | 2.1 mm |

Table 5 summarises some characterising parameters of Examples 1 through 6 and the Comparative Example. The following are compared:

TL(A): integrated light transmittance per ISO 9050, measured with a light source of illuminant A TTS: total incident solar energy per ISO 13837

R(A)p-pol: integrated light reflection relative to p-polarised radiation, measured with a p-polarised light source of illuminant A at an angle of incidence of 65° and a viewing angle of 65° relative to the interior-side surface normal a*(A)p-pol, b*(A)p-pol: colour values in the L*a*b* colour space as a reflection colour relative to p-polarised radiation, measured with a p-polarised light source of illuminant A at an angle of incidence of 65° and a viewing angle of 65° relative to the interior-side surface normal The light transmittance TL(A) is a measure of the transparency of the composite pane 10, with, in particular for windshields, values greater than 70% desirable. The incident solar energy TTS is a measure for the energy input into the vehicle interior and thus for thermal comfort. R(A)p-pol is a measure of the reflectivity relative to the radiation of the HUD projector 4 and thus for the intensity of the HUD projection. The colour values in the L*a*b* colour space are a measure of how colour-neutral the HUD display is, wherein the values should be as near zero as possible.

TABLE 5

| | TL(A)/% | TTS/% | R(A)p-pol/% | a*(A)p-pol | b*(A)p-pol |
|---|---|---|---|---|---|
| Example 1 | 70.4 | 51.4 | 23.6 | 4.3 | 7.6 |
| Example 2 | 70.8 | 51.7 | 21.5 | 3.6 | 3.4 |
| Example 3 | 71.2 | 54.4 | 21.4 | 3.3 | 3.9 |
| Example 4 | 71.9 | 54.0 | 20.5 | 3.8 | 1.8 |
| Example 5 | 71.0 | 51.9 | 21.3 | 4.3 | 5.5 |
| Example 6 | 71.8 | 54.5 | 20.4 | 3.2 | 2.9 |
| Comparative Example | 71.9 | 58.3 | 21.3 | 1.3 | 0.6 |

It is clear from Table 5 that all Examples and also the Comparative Example have sufficiently high light transmittance TL(A) for the composite panes 10 to be able to be used as windshields. In contrast to the Comparative Example, the Examples according to the invention have a significantly lower TTS value—by means of the TCO layer 23 instead of a dielectric layer sequence, the incident solar energy is significantly reduced and the thermal comfort in the vehicle is increased. Surprisingly, reflectance that is high and comparable to the Comparative Example relative to the p-polarised radiation of the HUD projector 4 can still be achieved such that the composite panes 10 is suitable as a projection surface of a generic HUD projection arrangement.

LIST OF REFERENCE CHARACTERS

(10) composite pane
(1) outer pane
(2) inner pane
(3) thermoplastic intermediate layer
(4) HUD projector
(5) viewer/vehicle driver
(20) reflection coating
(21) electrically conductive layer/silver layer
(21.1), (21.2) first, second electrically conductive layer
(22a) anti-reflection layer
(22b) matching layer
(22c) refractive-index-enhancing layer
(23) layer based on a transparent conductive oxide (TCO)
(24) metallic blocking layer
(M1), (M2), (M3) first, second, third layer module
(O) upper edge of the windshield 10
(U) lower edge of the windshield 10
(B) HUD region of the windshield 10
(E) eyebox
(I) exterior-side surface of the outer pane 1 facing away from the intermediate layer 3
(II) Interior-side surface of the outer pane 1 facing the intermediate layer 3
(III) exterior-side surface of the inner pane 2 facing the intermediate layer 3
(IV) Interior-side surface of the inner pane 2 facing away from the intermediate layer 3

The invention claimed is:

1. A projection arrangement for a head-up display (HUD), comprising:
a composite pane, which comprises an outer pane and an inner pane joined to one another via a thermoplastic intermediate layer and has an HUD region; and
an HUD projector, which is directed at the HUD region; wherein
a radiation of the projector is at least partially p-polarised, and
the composite pane is provided with a reflection coating suitable for reflecting p-polarised radiation;
and wherein
the reflection coating comprises n electrically conductive layers based on silver and (n+1) layer modules wherein the (n+1) layer modules and the n electrically conductive layers are arranged alternatingly such that each electrically conductive layer is arranged between two layer modules, where is n a natural number greater than or equal to 1, and
at least one of the (n+1) layer modules is formed as a single layer based on a transparent conductive oxide, and the remaining layer modules, if present, are formed as dielectric layers or layer sequences, and
said single layer based on the transparent conductive oxide (i) is in direct contact with the thermoplastic intermediate layer and with a metallic blocking layer based on a metal or metal alloy having a geometric thickness of at most 0.5 nm, or (ii) is provided between and in direct contact with two of the electrically conductive layers and each of the two of the electrically conductive layers is a layer made of silver, or (iii), n is equal to 1and the single layer based on the transparent conductive oxide is provided between and in direct contact with one of the outer and inner panes and the single electrically conductive layer.

2. The projection arrangement according to claim 1, wherein the number n is equal to 1 and said single layer based on the transparent conductive oxide (i) is in direct contact with the thermoplastic intermediate layer and with a metallic blocking layer based on a metal or metal alloy having a geometric thickness of at most 0.5 nm, or (iii) is provided between and in direct contact with one of the outer and inner panes and the single electrically conductive layer.

3. The projection arrangement according to claim 1, wherein exactly one of the (n+1) layer modules is formed as a layer based on an electrically conductive oxide, whereas the remaining layer modules are formed as dielectric layers or layer sequences.

4. The projection arrangement according to claim 1, wherein a metallic blocking layer having a thickness of less than 1 nm is arranged between at least one electrically conductive layer and an overlying layer module.

5. The projection arrangement according to claim 1, wherein a thickness of each electrically conductive layer is at least 7 nm.

6. The projection arrangement according to claim 1, wherein a thickness of the at least one layer based on the transparent conductive oxide is from 20 nm to 100 nm.

7. The projection arrangement according to claim 1, wherein the transparent conductive oxide is indium tin oxide.

8. The projection arrangement according to claim 1, wherein an optical thickness of the dielectric layers or layer sequences is from 50 nm to 150 nm.

9. The projection arrangement according to claim 1, wherein the dielectric layers or layer sequences comprise:
a lower anti-reflection layer with a refractive index of at least 1.9 is arranged,
optionally, a refractive-index-enhancing layer with a refractive index of at least 2.1,
optionally, a matching layer.

10. The projection arrangement according to claim 1, wherein the reflection coating consists of only the silver layers and the layer modules, as well as optional metallic blocking layers having a thickness of less than 1 nm.

11. The projection arrangement according to claim 1, wherein the composite pane with the reflection coating has an integrated light reflection relative to p-polarised radiation of at least 15%, measured with a p-polarised illuminant A light source at an angle of incidence of 65° and a viewing angle of 65° relative to a surface normal of the surface of the inner pane facing away from the intermediate layer.

12. The projection arrangement according to claim 1, wherein the composite pane with the reflection coating has a TTS value per ISO 13837 of at most 55%.

13. The projection arrangement according to claim 1, wherein the reflection coating is arranged on a surface of the outer pane or the inner pane facing the intermediate layer or within the intermediate layer.

14. The projection arrangement according to claim 1, wherein the outer pane is tinted or coloured and has light transmittance of at least 80%.

15. A method comprising providing a projection arrangement according to claim 1 as an HUD in a vehicle on land, on water, or in the air.

16. The projection arrangement according to claim 5, wherein the thickness of each electrically conductive layer is at least 14 nm.

17. The projection arrangement according to claim 6, wherein the thickness of the at least one layer based on the transparent conductive oxide is from 30 nm to 80 nm.

18. The projection arrangement according to claim 9, wherein the lower anti-reflection layer is based on silicon nitride, the refractive-index-enhancing layer is based on a mixed silicon-metal nitride, and the matching layer is based on zinc oxide.

19. The projection arrangement according to claim 18, wherein the refractive-index-enhancing layer is based on mixed silicon-zirconium nitride, mixed silicon-titanium nitride, or mixed silicon-hafnium nitride.

20. The method according to claim 15, wherein the vehicle is a motor vehicle, rail vehicle, aircraft, or watercraft.

21. The projection arrangement according to claim 1, wherein said single layer based on said transparent conductive oxide is in contact with a metallic blocking layer that is in contact with said at least one of the n electrically conductive layers based on silver.

22. The projection arrangement according to claim 1, wherein each of the inner and outer panes is a glass pane.

23. A projection arrangement for a head-up display (HUD), comprising:

a composite pane, which comprises an outer pane and an inner pane joined to one another via a thermoplastic intermediate layer and has an HUD region; and an HUD projector, which is directed at the HUD region; wherein a radiation of the projector is at least partially p-polarised, and the composite pane is provided with a reflection coating suitable for reflecting p-polarised radiation;

and wherein the reflection coating comprises n electrically conductive layers based on silver and (n+1) layer modules wherein the (n+1) layer modules and the n electrically conductive layers are arranged alternatingly such that each electrically conductive layer is arranged between two layer modules, where is n a natural number greater than or equal to 1, at least one of the (n+1) layer modules is formed as a single layer based on a transparent conductive oxide, and the remaining layer modules, if present, are formed as dielectric layers or layer sequences, and the number n is equal to 1 and said single layer based on the transparent conductive oxide (i) is in direct contact with the thermoplastic intermediate layer and with a metallic blocking layer based on a metal or metal alloy having a geometric thickness of at most 0.5 nm, or (iii) is provided between and in direct contact with one of the outer and inner panes and the single electrically conductive layer.

24. The projection arrangement according to claim 23, wherein each of the inner and outer panes is a glass pane.

* * * * *